United States Patent [19]

Nakajima

[11] Patent Number: 4,769,145
[45] Date of Patent: Sep. 6, 1988

[54] CENTRIFUGAL ULTRAFILTER UNIT FOR ULTRAFILTRATION OF BIOCHEMICAL SOLUTIONS

[75] Inventor: Motoo Nakajima, Chiba, Japan

[73] Assignee: Toyo Soda Manufacturing Co., Ltd., Tokyo, Japan

[21] Appl. No.: 713,657

[22] Filed: Mar. 19, 1985

[30] Foreign Application Priority Data

Mar. 21, 1984 [JP] Japan .................................. 59-53824

[51] Int. Cl.$^4$ ............................................. B01D 13/00
[52] U.S. Cl. ................ 210/321.75; 210/445; 210/451; 210/453; 210/455
[58] Field of Search .................. 210/321.1, 433.2, 445, 210/451, 453, 455

[56] References Cited

U.S. PATENT DOCUMENTS

| | | | |
|---|---|---|---|
| 3,400,575 | 9/1968 | Madden | 210/433.2 X |
| 3,488,768 | 1/1970 | Rigopulos | 210/650 |
| 3,905,905 | 9/1975 | O'Leary et al. | 210/436 |
| 4,534,863 | 8/1985 | Bacon et al. | 210/927 X |
| 4,614,585 | 9/1986 | Mehra et al. | 210/450 |

FOREIGN PATENT DOCUMENTS

| | | |
|---|---|---|
| 58-133129 | 8/1983 | Japan . |
| 2539657 | 3/1976 | United Kingdom . |
| 1548026 | 4/1979 | United Kingdom . |
| 2092914 | 8/1982 | United Kingdom . |

Primary Examiner—Frank Sever
Attorney, Agent, or Firm—Armstrong, Nikaido, Marmelstein & Kubovcik

[57] ABSTRACT

A separator (1; 51) including a solution reservoir (3; 53) having a solution chamber (3a; 53a) for putting therein a solution, a membrane support base (4; 54) joined to the solution reservoir, an ultrafiltration-oriented filtering membrane (5; 55) held between the solution reservoir and the support base, and a filtrate cup (2) attached to the support base, in which the solution reservoir and the support base are each respectively made of a thermoplastic material, wherein the solution reservoir is ultrasonically welded to the support base at a part (3b; 53b) thereof spaced apart by a predetermined distance ($l_1$; $l_2$) from the filtering membrane.

8 Claims, 2 Drawing Sheets

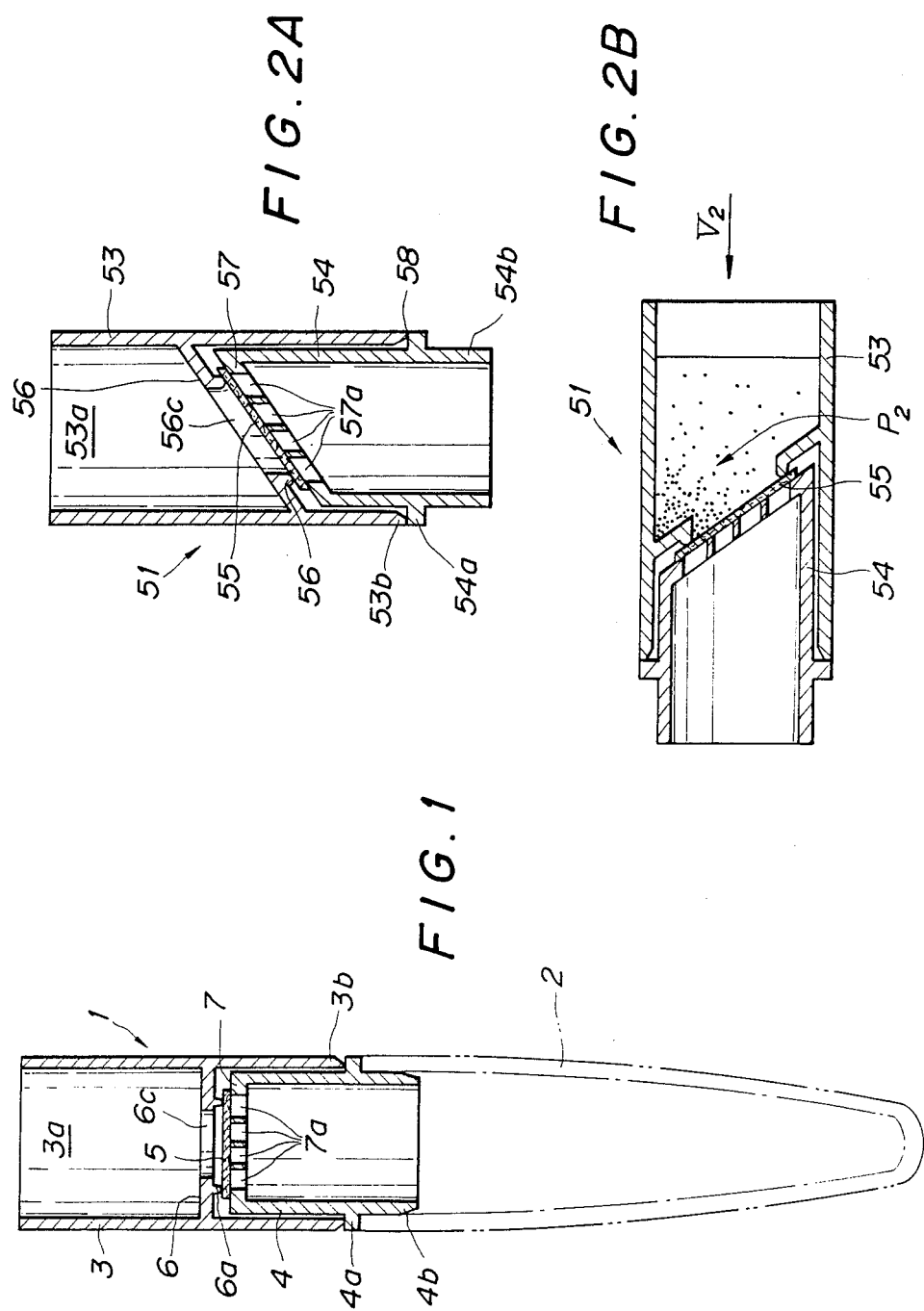

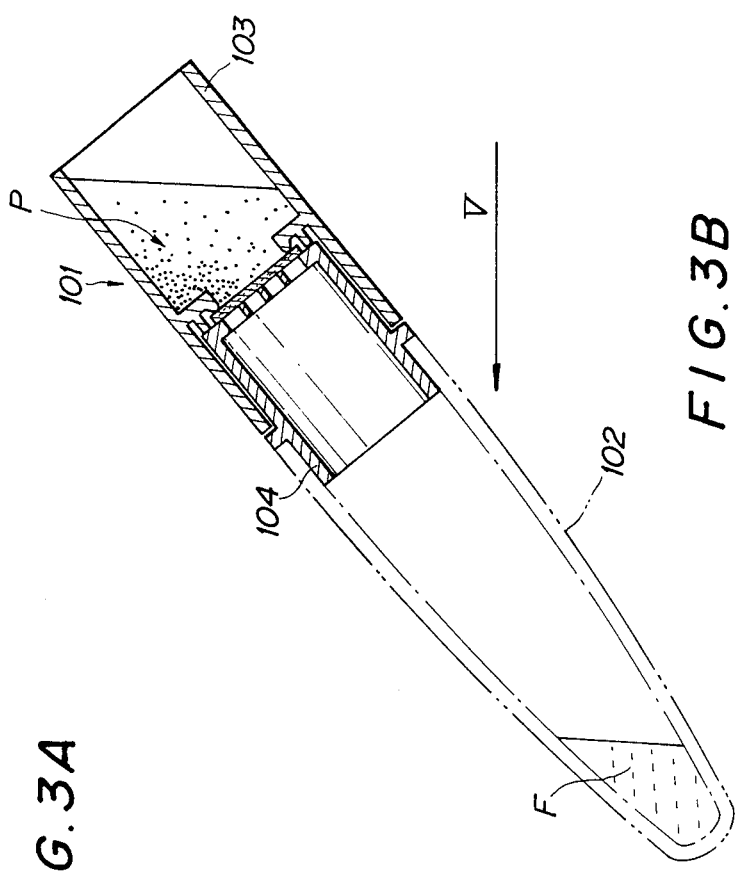
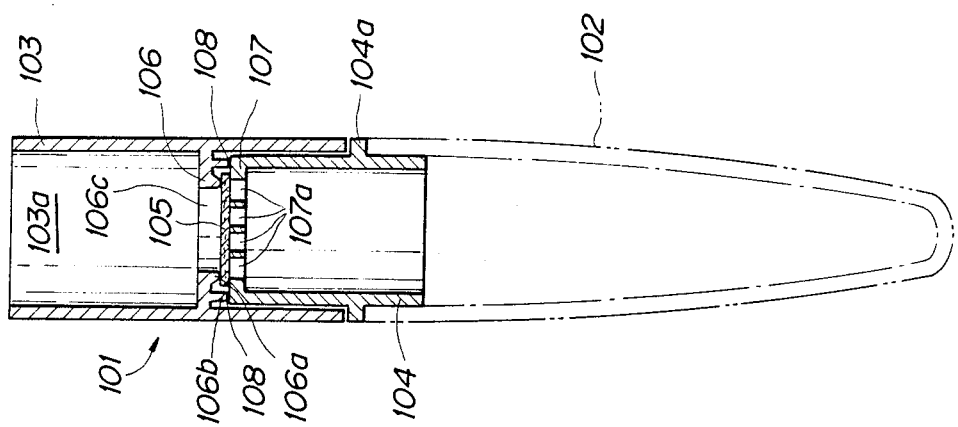

CENTRIFUGAL ULTRAFILTER UNIT FOR ULTRAFILTRATION OF BIOCHEMICAL SOLUTIONS

BACKGROUND OF THE INVENTION

1. Field of the Invention

The present invention generally relates to a separator for separating a solute from a solution. More particularly, the invention relates to a separator adapted for an ultrafiltration of a solute.

2. Description of Relevant Art

There has been already known an ultrafiltration process using a centrifugal separator or a filterpress or suction filter to separate a solute from a solution as a sample.

The ultrafiltration is a filtration of separating from a solution such particles as of sizes smaller than those of a normal filtration in which the size of particles to be filtered out ranges from $10^5$ to $10^7$ angstroms, that is, such a solute that has particle sizes ranging from a few dozen angstroms to a few micrometers, thus there being no particular limitations to the kind of the solution.

In this respect, due to the fact that viruses, polysaccharides, proteins, colloids, and microbes fall in such a size range, in recent years there has been found an extensive use of ultrafiltration in the field of biochemistry.

Among those ultrafiltration processes employed in the biochemical field, there is an example particularly using a centrifugal separator.

In such an ultrafiltration process, exemplarily, a blood serum or a blood plasma is selected as a test solution to separate or filter out a protein therefrom by way of an ultrafiltration. In this case, by having dissolved a low molecular substance such as an inorganic ion, a medicinal substance, or a hormone in the blood serum or the blood plasma before the ultrafiltration, there can be measured a binding fraction of such a substance with the protein, since low molecular substances bound to the protein are forced to be filtered out in the ultrafiltration.

Moreover, taking advantage of such fact, the ultra-filtration is used for separating through a membrane a low molecular substance of protein bonding type from that of protein non-bonding (free) type in a blood serum or a blood plasma.

In such way, the ultrafiltration is applied to an analysis of a low molecular substance such as an amino acid, a catechol amine, a vitamine, or a guanidine in a blood serum, in which generally a protein is needed to be removed from the blood serum.

Further, with respect to those medicinal subtances to be carried in the blood, the substanes falling into a protein (albumin) bonding type and a free type efficacious to the decease, the ultrafiltration is used also for measuring the concentration in blood of such protein free type medicinal substances.

Furthermore, as will be understood from the foregoing description, the ultrafiltration is used for an enrichment or concentration of a protein in the blood, as well. In the protein enrichment, a deionized water may be employed as solvent (buffer solution) to desalt the protein.

Incidentally, as of a disposable type adapted to put a test solution of approximately 2 ml or less to be filtered by use of a centrifuge, there is generally used such a separator as shown in FIG. 3A.

Referring now to FIG. 3A, which is a longitudinal sectional view of a separator of such type, designated at reference numeral 101 is the entirety of the separator. The separator 101 includes a test solution reservoir 103 of a cylindrical configuration open at both upper and lower ends thereof, the reservoir 103 having inside of the longtudinally intermediate part thereof a radially inwardly flanged portion 106 formed along the inner circumference thereof, a cylindrical membrane support base 104 fitted in the lower half of the solution reservoir 103, an ultrafiltration-oriented filtering membrane 105 interposed between the top face of the support base 104 and the underside of the flanged portion 106 of the solution reservoir 103 so as to extend perpendicularly to the axis of the reservoir 103, and a filtrate cup 102 detachably fitted on the lower part of the support base 104. When attaching to the centrifuge, the separator 101 has a reservoir cap (not shown) put on the solution reservoir 103. A proper part of the separator 101 is constituted with the solution reservoir 103, the filtering membrane 105, and the support base 104.

The flanged portion 106 has defined by the inner circumference thereof a circular central opening 106c for passing the test solution, while the opening 106c is wholly covered from below with the filtering membrane 105. The flanged portion 106 further has formed thereunder, along the inner circumference thereof, a radially inner ring-like projection 106a for holding from above the filtering membrane 105 and, outside of the projection 106a, a radially outer ring-like projection 106b for a welding use.

The support base 104 has a smaller diameter than the solution reservoir 103 and, when fitted therein, holds in position the filtering membrane 105 to be tight fitted between the inner projection 106a of the flanged portion 106 and a disc-like support portion 107 as the top of the support base 104. In the support portion 107, over an area thereof opposite to the opening 106c of the flanged portion 106, there are formed therethrough a plurality of small holes 107a for passing the filtrate.

In FIG. 3A, designated at reference character 103a is a solution chamber of the reservoir 103, and 104a is an outwardly flanged portion of the support base 104, which portion 104a is adapted for the attachment of the filtrate cup 102.

In the foregoing arrangement, the ultrafiltration-oriented filtering membrane 105 is made of a polysulphone, a polyvinyl chloride, a regenerated cellulose, a cellulose acetate, an acrylonitrile and vinyl chloride copolymer, or the like, and adapted for a nominal cutoff molecular weight within a range of five thousand to one million. For a filtering membrane, the term "cutoff molecular weight" means a cutoff value as specified in terms of molecular weight for molecules to be filtered through the membrane, and indirectly represents the size of surfacial pores of the membrane. For example, a filtering membrane of a cutoff molecular weight of 10,000 is adapted for the filtration of no more than those molecules not exceeding 10,000 in the molecular weight. The determination of cutoff molecular weight is made by use of a spherical protein of a known molecular weight.

The solution reservoir 103 as well as the support base 104 is made of a thermoplastic material such as an acrylic resin, a polystyrene, a polyethylene, a polypropylene, or a polycarbonate.

The outer ring-like projection 106b of the reservoir 103 and the support portion 107 of the base 104, both being made of such thermoplastic material, are joined with each other by way of an ultrasonic welding, whereas the joining therebetween may be otherwise effected. For example, though being not described herein, there is a well-known system by way of a high-frequency welding, besides one which, when assembling a separator, does not need welding but employs a clip to join a support base to a solution reservoir.

In the manufacture of the aforementioned separator 101, particularly when constituting the proper part thereof, there is employed an ultrasonic welding process which first includes steps of placing the filtering membrane 105 on the support portion 107 of the support base 104, and inserting the support base 104 from below into the lower half of the solution reservoir 103, thereby pinching to hold the membrane 105 between the support portion 107 of the base 104 and the inner ring-like projection 106a of the reservoir 103, so that the top face of the support portion 107 is brought into abutment with the lower edge of the outer ring-like projection 106b of the reservoir 103.

Next, as principal steps of the ultrasonic welding process, an unshown ultrasonic welder has an ultrasonic horn thereof forced to abut with a load on the top of the solution reservoir 103, and ultrasonic vibrations of a predetermined amplitude and a predetermined frequency are applied from the horn to the reservoir 103, thereby generating heat over the contact area between the top face of the support portion 107 and the lower edge of the outer projection 106b, welding the support portion 107 and the outer projection 106b to each other, whereby a ring-like welded portion 108 is formed. The time period for applying ultrasonic vibrations is usually within a range of 0.5 to 2 seconds, though variable with the type of employed thermoplastic material.

Recent years have found an extensive use of such an ultrasonic welding process as described above, by virtue of advantages thereof such that the generation of heat is controlled at no more than a loaded contact area as a portion to be welded, and that the weldment is completed within a very short period of time. For example, in the field of a cassette tape also, an ultrasonic welding has found a recent application thereof to the joining between upper and lower halves of a tape casing.

As will be easily understood, the separator 101 shown in FIG. 3A, which is prefabricated into a unit, is free from some shortcomings that otherwise may be encountered such as when making an ultrafiltration using a weld-less type separator of which proper body is fabricated, not by welding a support base to a solution reservoir, but by manually assembling together such two parts and a filtering membrane, with the possiblity of assembling same in error or causing a rupture of the membrane.

However, still in the separator 101, in which the welded portion 108 is positioned in close vicinity to the filtering membrane 105, the filtering membrane 105 may have a part thereof thermally melted during the ultrasonic welding process or likely to be otherwise damaged by heat.

Incidentally, with respect to the centrifuge, there are two well-known types: an angle type and a swing type, each respectively utilized in both ultrafiltration and normal filtration. In general, when put in an angle type centrifuge, separators are centrifuged into inclined positions thereof. In a swing type centrifuge, they are normally swingably suspended so as to be centifuged into substantially horizontal positions thereof.

In this respect, when the separator 101 (as applied to the ultrafiltration of a blood serum or a blood plasma) is centrifuged by an angle type centrifuge, the test solution put in the solution chamber 103a has concentration-polarized protein particles thereof dislocated under centrifugal forces to one side in the lower part of the solution chamber 103a, so that the degree of concentration polarization becomes decreased on the filtering membrane 105, thus raising the filtering rate. To the contrary, in the case of a swing type centrifuge, concentration-polarized protein particles are centrifuged to be distributed over the membrane 105, thus keeping the filtering rate lower than expected. For such reasons, the conventional separator 101 is restricted in the type selection of centrifuge.

For referential purpose, FIG. 3B is attached hereto to illustrate a state of the separator 101 as centrifuged by an unshown centrifuge of an angle type with a rotor of an approximately 45° inclination. Designated at reference character P is a group of concentration-polarized protein particles, F is a test solution containing a low-molecular substance of free type, and V is a centrifugal force in the form of a vector.

The present invention has been achieved to effectively solve such problems of a conventional separator, including a thermal influence on a filtering membrane in an ultrasonic welding process in the fabrication of a proper part of the separator as well as a restriction in the type selection of centrifuge.

SUMMARY OF THE INVENTION

According to the present invention, there is provided a separator including a solution reservoir having a solution chamber for putting therein a solution and an opening for letting therethrough the solution, a membrane support base joined to the solution reservoir, an ultrafiltration-oriented filtering membrane pinched to be held in position by and between the solution chamber and the support base so as to cover the whole area of the opening for letting the solution, and a filtrate cup attached to the support base, in which the support base has formed, in a part thereof opposite to the opening for letting the solution, at least one small hole for letting therethrough a filtrate, and in which the solution reservoir and the support base are each respectively made of a thermoplastic material, wherein the solution reservoir is ultrasonically welded, at a part thereof substantially distant by a predetermined distance from the filtering membrane, to the support base.

Moreover, according to the present invention, the filtering membrane may be inclined with respect to the axis of the solution reservoir.

Accordingly, an object of the present invention is to provide a separator, which effectively prevents a thermal effect from being exerted on an ultrafiltration-oriented filtering membrane in an ultrasonic welding between a solution reservoir and a membrane support base.

Another object of the present invention is to provide a separator, which is adapted for use in a swing type centrifuge.

The above and further objects, details and advantages of the present invention will become apparent from the following detailed description of preferred embodiments of the invention when read in conjunction with the accompanying drawings.

BRIEF DESCRIPTION OF THE DRAWINGS

FIG. 1 is a longitudinal sectional view of a separator according to a first embodiment of the invention.

FIG. 2A is a longitudinal sectional view of a separator according to a second embodiment of the invention.

FIG. 2B is a longitudinal sectional view of the separator of FIG. 2A, as centrifuged by a swing type centrifuge.

FIG. 3A is a longitudinal sectional view of a conventional separator.

FIG. 3B is a longitudinal sectional view of the separator of FIG. 3A, as centrifuged by an angle type centrifuge.

DETAILED DESCRIPTION OF THE PREFERRED EMBODIMENTS

Referring first to FIG. 1, designated at reference numeral 1 is a separator according to the first embodiment of the invention, which is adapted for use in an angle type centrifuge. The separator 1 comprises a test solution reservoir 3 of a cylindrical configuration open at both upper and lower ends thereof, the solution reservoir 3 having inside of the longtudinally intermediate part thereof a radially inwardly flanged portion 6 formed along the inner circumference thereof, a cylindrical membrane support base 4 fitted in the lower half of the solution reservoir 3, an ultrafiltration-oriented filtering membrane 5 interposed between the top face of the support base 4 and the underside of the flanged portion 6 of the solution reservoir 3 so as to extend perpendicularly to the axis of the reservoir 3, and a filtrate cup 2 detachably fitted on the lower part of the support base 4. When attaching to the centrifuge, the separator 1 has a reservoir cap (not shown) put on the solution reservoir 3. A proper part of the separator 1 is constituted with the solution reservoir 3, the filtering membrane 5, and the support base 4.

The flanged portion 6 has defined by the inner circumference thereof a circular central opening 6c for letting therethrough the test solution, while the opening 6c is wholly covered from below with the filtering membrane 5. Further, the flanged portion 6 has formed thereunder, along the inner circumference thereof, a ring-like projection 6a of a relatively small diameter, for holding from above the filtering membrane 5.

The support base 4 has a smaller diameter than the solution reservoir 3 or, more definitely, the outside diameter of the base 4 is slightly smaller than the inside diameter of the reservoir 3. In FIG. 1, the base 4 is simply, that is unforcibly, fitted in the reservoir 3 to hold in position the filtering membrane 5 between the ring-like projection 6a of the flanged portion 6 and a disc-like support portion 7 as the top of the base 4. That is, the separator 1 of FIG. 1 is given as of a state before an ultrasonic welding process. The base 4 has a bottom edge 4b thereof tapered for the facilitation of attachment of the filtrate cup 2. In the support portion 7, over an area thereof opposite to the opening 6c of the flanged portion 6, there are formed therethrough a plurality of small holes 7a for letting therethrough a filtrate.

The support base 4 has an outwardly flanged portion 4a provided on the outer circumference of the longitudinally intermediate part thereof, at such a position that, when the filtering membrane 5 is unforcibly held between the ring-like projection 6a of the solution reservoir 3 and the support portion 7 of the support base 4, a bottom edge 3b of the reservoir 3 abuts on the upper face of the flanged portion 4a of the base 4. The bottom edge 3b of the reservoir 3 is downwardly sharpened in the cross section thereof for the facilitation of an ultrasonic welding to be made between this edge 3b and the flanged portion 4a of the base 4. The part to be ultrasonically welded is thus substantially distant by a predetermined distance 11 from the filtering membrane 5.

In FIG. 1, designated at reference character 3a is a solution chamber of the reservoir 3.

The solution reservoir 3, the support base 4, and the filtering membrane 5 are each respectively made of a material similar to that of corresponding parts of the aforementioned prior art.

In the manufacture of the separator 1, to complete the proper body as a unit, there is employed the ultrasonic welding process including steps of setting the proper body as of the state of FIG. 1, bringing an ultrasonic horn of an unshown ultrasonic welder into forced abutment with the top of the solution reservoir 3, and applying ultrasonic vibrations of a predetermined amplitude and a predetermined frequency from the horn to the reservoir 3, thereby generating heat over the contact area between the bottom edge 3b of the reservoir 3 and the flanged portion 4a of the support base 4, welding them to each other.

As aforementioned, the separator 1 is adapted for use in an angle type centrifuge, and used in a manner similar to that described in conjunction with FIGS. 3A and 3B.

As will be understood from the foregoing description, in the separator 1 according to the first embodiment of the invention, an ultrasonic welding of the proper body is made at a position appreciably spaced apart from the filtering membrane 5, thus successfully keeping the membrane free from thermal damage, assuring a filtering property thereof. Moreover, as well as the flanged portion 4a of the base 4 adapted for attachment of the filtrate cup 2, the bottom edge 3b of the solution reservoir 3 is used as the part to be welded, without the need of a conventional radially outer ring-like projection, thus permitting a simplified design of solution reservoir and hence that of the form for an injection.

Referring now to FIG. 2A, designated at reference numeral 51 is a separator according to the second embodiment of the invention, which is adapted for use in a swing type centrifuge. The separator 51 comprises a test solution reservoir 53 of a cylindrical configuration open at both upper and lower ends thereof, the solution reservoir 53 having inside of the longtudinally intermediate part thereof a flanged portion 56 formed along the inner circumference thereof so as to extend obliquely relative to the axis of the reservoir 53, a cylindrical membrane support base 54 fitted in the lower half of the solution reservoir 53 and obliquely cut to have the top face of an upper part 57 thereof sloped to be parallel with the flanged portion 56 of the reservoir 53, an ultrafiltration-oriented filtering membrane 55 interposed between the top face of the support base 54 and the underside of the flanged portion 56 of the solution reservoir 53 so as to extend obliquely relative to the axis of the reservoir 53, and a filtrate cup (not shown) detachably fitted on the lower part of the support base 54. When attaching to the centrifuge, the separator 51 has a reservoir cap (not shown) put on the solution reservoir 53. A proper part of the separator 51 is constituted with the solution reservoir 53, the filtering membrane 55, and the support base 54.

The flanged portion 56 has defined by the inner circumference thereof an ellipsoidal central opening 56c for letting therethrough the test solution, while the opening 56c is wholly covered from below with the filtering membrane 55. Further, the flanged portion 56 has formed thereunder, along the inner circumference thereof, an ellipsoidal ring-like projection 56a for holding from above the filtering membrane 55.

The support base 54 has a smaller diameter than the solution reservoir 53 or, more definitely, the outside diameter of the base 54 is slightly smaller than the inside diameter of the reservoir 53. In FIG. 2A, the base 54 is forcibly fitted in the reservoir 53 to hold in position the filtering membrane 55 to be tight fitted between the ellipsoidal ring-like projection 56a of the flanged portion 56 and the upper part 57 as an ellipsoidal support portion of the base 54. In the upper part 57, over an area thereof opposite to the opening 56c of the flanged portion 56, there are formed therethrough a plurality of small holes 57a for letting therethrough a filtrate. The support base 54 has on the outer circumference of the longitudinally intermediate part thereof an outwardly flanged portion 54a adapted for attachment thereto of the upper end of the filtrate cup.

In FIG. 2A, designated at reference character 53a is a solution chamber of the reservoir 53.

Like the case of the first embodiment, the solution reservoir 53, the support base 54, and the filtering membrane 55 are each respectively made of a material similar to that of corresponding parts of the aforementioned prior art.

The upper face of the flanged portion 54a of the support base 54 is joined by way of an ultrasonic welding to a bottom edge 53b of the solution reservoir 53, thereby forming therebetween a ring-like welded portion 58. In this respect, in a state before the ultrasonic welding, the bottom edge 53b of the reservoir 53 is downwardly sharpened in the cross section to facilitate the ultrasonic welding.

As seen from FIG. 2A, the welded portion 58 is substantially distant at least by a predetermined distance $l_2$ from the filtering membrane 55.

As will be understood from the foregoing description, in the separator 51 according to the second embodiment of the invention, the filtering membrane 55 is obliquely arranged relative to the axis of the solution reservoir 53, thus providing a relatively large effective filtering area in comparison with that of the first embodiment.

Moreover, similarly to the case of the first embodiment, the welded portion 58 is formed at a position appreciably spaced apart from the filtering membrane 55, thus successfully keeping the membrane 55 free from thermal damage during an ultrasonic welding process in which the proper body of the separator 51 is fabricated in a unit, assuring a filtering property thereof. Other advantages of the first embodiment are achived in the second embodiment, too.

FIG. 2B is a longitudinal sectional view of the separator 51 as centrifuged by a swing type centrifuge, while the filtrate cup is not shown.

In FIG. 2B, designated at reference character $V_2$ is a centrifugal force in the form of a vector, and $P_2$ is a group of concentration-polarized protein particles. As can be seen from the Figure, even when centrifuged by the swing type machine, concentration-polarized protein particles in a blood serum or a blood plasma as the test solution are dislocated into one corner of the solution chamber 53a, thus keeping the filtering rate high, in addition to an increased filtering capacity due to the enlarged effective filtering area.

In the foregoing two embodiments of the invention, the filtrate cup may preferably be ultrasonically welded to the support base, in case the separator is intended to be used for the enrichment of a test solution.

As a matter of course, the present invention may be embodied in the form of a separator adapted for an ultrafiltration using a filterpress or suction filter.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

I claim:

1. A centrifugal ultrafilter unit comprising a solution resevoir having a solution chamber for putting therein a solution and an opening for letting therethrough said solution;

a membrane support base joined to said solution reservoir;

an ultrafiltration filtering membrane having a nominal cutoff molecular weight of 5,000 to 3,000,000 oriented for performing ultrafiltration, pinched to be held in position by and between said solution chamber and said support base so as to cover said opening for letting therethrough said solution, said filtering membrane being of sufficient size to cover the entirety of said opening; and a filtrate cup attached to said support base, in which:

said support base has formed, in a part thereof opposite to said opening for letting said solution, at least one small hole for letting therethrough a filtrate; and said solution reservoir and said support base are each respectively made of a thermoplastic material, and, means for preventing damage to said filter membrane including an ultrasonic weld positioned at a part of said solution reservoir, substantially distant by a predetermined distance from said filtering membrane, to said support base, as a means for preventing damage to said filter membrane.

2. A centrifugal ultrafilter unit according to claim 1, wherein:

said solution reservoir comprises a first cylindrical member having on the inside, at a longitudinally intermediate part thereof, an inwardly flanged portion;

said support base comprises a second cylindrical member fitted in the lower half of said solution reservoir, said second cylindrical member having in an upper part thereof a support portion which cooperates with said inwardly flanged portion to hold therebetween said filtering membrane; and said solution reservoir has a bottom edge thereof spaced apart by said predetermined distance from said filtering membrane and ultrasonically welded to an outwardly flanged portion on an outer circumference at a longitudinally intermediate part of said support base.

3. A centrifugal ultrafilter unit according to claim 2, wherein:

said opening for letting said solution is defined by said inwardly flanged portion; and said at least one small hole for letting said filtrate therethrough is formed in said support portion.

4. A centrifugal ultrafilter unit according to claim 3, wherein:

said filtering membrane is held between said inwardly flanged portion and said support portion so as to extend perpendicularly to an axis of said solution reservoir.

5. A centrifugal ultrafilter unit according to claim 3, wherein:

said filtering membrane is held between said inwardly flanged portion and said support portion so as to extend obliquely relative to an axis of said solution reservoir.

6. A centrifugal ultrafilter unit according to claim 2, wherein:

said outwardly flanged portion is adapted for an attachment thereto of the upper end of said filtrate cup as fitted on said support base.

7. A centrifugal ultrafilter unit according to claim 1, wherein:

said filtering membrane is made of a material selected from the group consisting of a polysulphone, a polyvinyl chloride, a regenerated cellulose, a cellulose acetate, and an acrylonitrile and vinyl chloride copolymer.

8. A centrifugal ultrafilter unit according to claim 1, wherein:

said solution reservoir and said support base are each respectively made of a material selected from the group consisting of an acrylic resin, a polystyrene, a polyethylene, a polypropylene, and a polycarbonate.

* * * * *